(12) United States Patent
Lo et al.

(10) Patent No.: US 8,218,087 B2
(45) Date of Patent: Jul. 10, 2012

(54) METHOD FOR ADJUSTING IMAGE

(75) Inventors: Kai-Wen Lo, Taoyuan (TW); Ren-Jie Yang, Taipei (TW)

(73) Assignee: MSI Computer (Shenzhen) Co., Ltd., Shenzhen (CN)

( * ) Notice: Subject to any disclaimer, the term of this patent is extended or adjusted under 35 U.S.C. 154(b) by 354 days.

(21) Appl. No.: 12/728,385

(22) Filed: Mar. 22, 2010

(65) Prior Publication Data

US 2011/0141371 A1    Jun. 16, 2011

(30) Foreign Application Priority Data

Dec. 16, 2009   (TW) ............................... 98143068 A

(51) Int. Cl.
*H04N 5/14* (2006.01)

(52) U.S. Cl. ........ 348/673; 348/686; 348/687; 348/678; 348/655; 348/674; 382/274

(58) Field of Classification Search ................. 348/673, 348/687, 686, 678, 655, 674; 382/274
See application file for complete search history.

(56) References Cited

U.S. PATENT DOCUMENTS

| | | | | |
|---|---|---|---|---|
| 6,771,320 | B2 * | 8/2004 | Choi | 348/625 |
| 7,102,695 | B2 * | 9/2006 | Han et al. | 348/673 |
| 7,113,227 | B1 * | 9/2006 | Kakuya et al. | 348/678 |
| 7,167,214 | B2 * | 1/2007 | Hirosue | 348/687 |
| 7,339,627 | B2 * | 3/2008 | Schoner et al. | 348/558 |
| 7,352,410 | B2 * | 4/2008 | Chou | 348/673 |
| 7,483,083 | B2 * | 1/2009 | Li et al. | 348/673 |

\* cited by examiner

*Primary Examiner* — Jefferey Harold
*Assistant Examiner* — Mustafizur Rahman
(74) *Attorney, Agent, or Firm* — Rabin & Berdo, P.C.

(57) ABSTRACT

A method for adjusting image is applied to an image output device. According to the method, the image output device firstly obtains a current image frame including plural pixels, and analyzes an intensity of an input image signal value of each pixel. The image output device defines each pixel having the input image signal value being smaller than a critical value as a dark pixel, and counts a number of the dark pixels to obtain a ratio of the dark pixels among all the pixels to serve as a dark pixel ratio. The image output device determines an image adjusting curve equation according to the dark pixel ratio, substitutes the input image signal values to the image adjusting curve equation, and obtains output image signal values of the pixels. Finally, the image output device combines all the output image signal values to obtain a final output image frame.

14 Claims, 8 Drawing Sheets

| sorting value of the image adjusting curve equation = 0 | | | | | | |
|---|---|---|---|---|---|---|
| input image signal value | 0 | 1 | 2 | 3 | ... 254 | 255 |
| output of the image signal value | X0 | X1 | X2 | X3 | ... X254 | X255 |

Fig. 10

| sorting value of the image adjusting curve equation = 1 to 256 | | | | | | |
|---|---|---|---|---|---|---|
| input image signal value | 0 | 1 | 2 | 3 | ... 254 | 255 |
| output of the image signal value | Y0 | Y1 | Y2 | Y3 | ... Y254 | Y255 |

Fig. 11

| sorting value of the image adjusting curve equation = 257 | | | | | | |
|---|---|---|---|---|---|---|
| input image signal value | 0 | 1 | 2 | 3 | ... 254 | 255 |
| output of the image signal value | Z0 | Z1 | Z2 | Z3 | ... Z254 | Z255 |

Fig. 12

METHOD FOR ADJUSTING IMAGE

CROSS-REFERENCES TO RELATED APPLICATIONS

This non-provisional application claims priority under 35 U.S.C. §119(a) on Patent Application No. 98143068 filed in Taiwan, R.O.C. on 2009/12/16, the entire contents of which are hereby incorporated by reference.

BACKGROUND OF THE INVENTION

1. Technical Field

The present invention relates to a method for adjusting image, and more particularly to a method for adjusting image capable of improving an adjustment performance by using lower hardware resources.

2. Related Art

With the rapid progress of technology, liquid crystal displays or plasma display has replaced conventional cathode-ray tube (CRT) displays. Furthermore, the LCD displays has been widely applied to electronic products having different sizes. However, when multimedia devices play video media, the brightness, contrast, and color saturation of the screens are not always at optimum values. In addition, the video image frame is sometimes bright and sometimes dark, and the color saturation is also changed at any time, such that when playing the video image, the device has to dynamically and appropriately adjust the brightness, contrast, and color saturation, so as to achieve an optimum displaying performance.

The current image processing technology has many different image frame adjusting methods, but such image frame adjusting methods can not bring high image quality with the lower hardware resources. Certain correction methods achieving better image frame quality cannot be applied to the models having hardware resources, especially portable electronic products. Nowadays, the common methods for adjusting image include a single curve method, a dynamic curve method, and a quasi high dynamic range (quasi-HDR) method.

In the single curve method, an image signal value of each pixel in an input image is substituted to an image signal value adjusting curve equation, so as to adjust the image signal value of each pixel, thereby achieving an image reinforcement conversion. Each pixel is adjusted through the single image signal value adjusting curve equation, such that lower hardware resources are consumed, which can be achieved even if the processor has a low performance. However, by only using the single image signal value adjusting curve equation, the variations in response to properties of films and relations among the image frames cannot be realized, so that the reinforcement effect is not distinct.

The dynamic curve method is similar to the single curve method, except that the dynamic curve method uses a plurality of image signal value adjusting curve equations. Before an image is adjusted, the image is analyzed and a curve equation most suitable for the current image is selected, and then the image signal values of the image are substituted to the selected curve equation for adjustment. As compared with the single curve method, the dynamic curve method can make further adjustment according to properties of the image frames and the film, thereby achieving the better effect. However, before the adjustment, the image must be analyzed first, such that higher hardware resources are required.

In the quasi-HDR method, according to the attributes of the image, only a part of the image is adjusted. For example, under a state of not adjusting the bright parts of the image, only the brightness of the dark parts is improved, thereby eliminating the over-dark regions in the image frame. The quasi-HDR method is usually used in a post-process of the pictures, and may show the excellent effect under the single image frame, but when the image frames are continuously played, the image frame may have redundant changes (for example, light halo). The major disadvantage of the quasi-HDR lies in requiring great hardware resources, such that high-level processors must be used together.

SUMMARY

Among method for adjusting image in the prior art, a single curve method, a dynamic curve method, and a quasi-HDR method respectively have problems so that a reinforcement effect is poor or hardware resources are over-consumed. Accordingly, the present invention is directed to a method for adjusting image, which is capable of achieving an excellent reinforcement effect by using lower hardware resources.

The present invention provides a method for adjusting image, which is applied to an image output device. According to the method, the image output device firstly obtains a current image frame including a plurality of pixels, and then analyzes an intensity of an input image signal value of each pixel. The image output device defines each pixel having the input image signal value being smaller than a critical value as a dark pixel, and counts a number of the dark pixels to obtain a ratio of the dark pixels among all the pixels to serve as a dark pixel ratio. Finally, the image output device gives an image adjusting curve equation according to the dark pixel ratio, substitutes the input image signal value of each pixel to the image adjusting curve equation, obtains an output image signal value of each pixel after making calculations, and combines all the output image signal values to obtain a final output image frame.

The present invention analyzes the dark pixel ratio instead of analyzing other characteristics of the image frame, so as to find out the corresponding image adjusting curve equation. In addition, the dark pixel ratios and the image adjusting curve equations can be mapped in a one-to-one manner in the form of tables, such that the image output device directly reads the corresponding output image signal values from these tables according to the input image signal values of the pixels, thereby greatly reducing the hardware resources consumed in calculation. Therefore, the present invention achieves the effects of the dynamic curve method, and consumes hardware resources similar to that of the single curve method, thereby solving the problem in the prior art that it is impossible to reduce the hardware resources while improving the image adjustment effect.

BRIEF DESCRIPTION OF THE DRAWINGS

FIGS. 10, 11, and 12 are tables of image adjusting curve equations according to the present invention.

DETAILED DESCRIPTION

Figure 1:
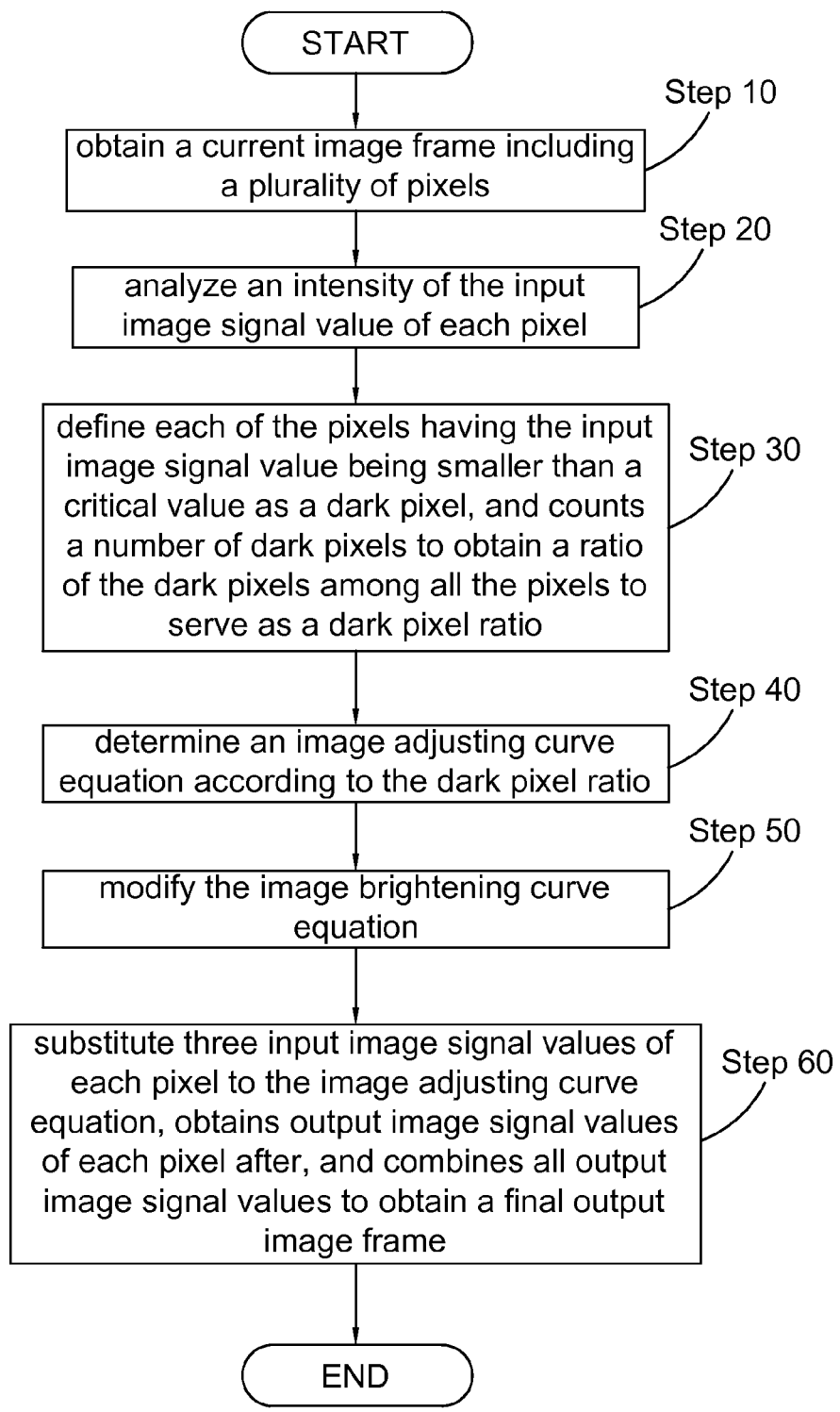
FIG. 1 is a flow chart of the present invention.

Please refer to FIG. 1, in which a method for adjusting image according to an embodiment of the present invention is applied to an image output device. The image output device may be a multimedia playing device, or a data processing device (for example, a personal computer), executing a multimedia playing program.

Please refer to FIG. 1, in which according to the method, the image output device firstly obtains a current image frame including a plurality of pixels (Step 10). Next, the image output device analyzes an intensity of the input image signal value of each pixel (Step 20).

Generally, a brightness of each pixel serves as the input image signal value, an intensity thereof is analyzed, and an obtained analysis result is used for performing image adjustment, so as to achieve a preferred image adjusting result. However, image signals output from a common electronic device are usually RGB color signals. If the brightness of each pixel is analyzed, the RGB color signals has to be further converted into YUV signals, and a Y signal value serves as the brightness value. A G color signal value in the RGB color signals has a higher degree of correlation with the Y signal value, such that the G color signal value in the RGB color signals may also serve as an object to be analyzed.

Please refer to FIG. 1, in which a critical value is set in the image output device. After obtaining the input image signal values (for example, an input image signal value of the G color signal), from the pixels, the image output device defines each of the pixels having the input image signal value being smaller than the critical value as a dark pixel according to the critical value, and counts a number of dark pixels to obtain a ratio of the dark pixels among all the pixels to serve as a dark pixel ratio (Step 30).

Figure 2:
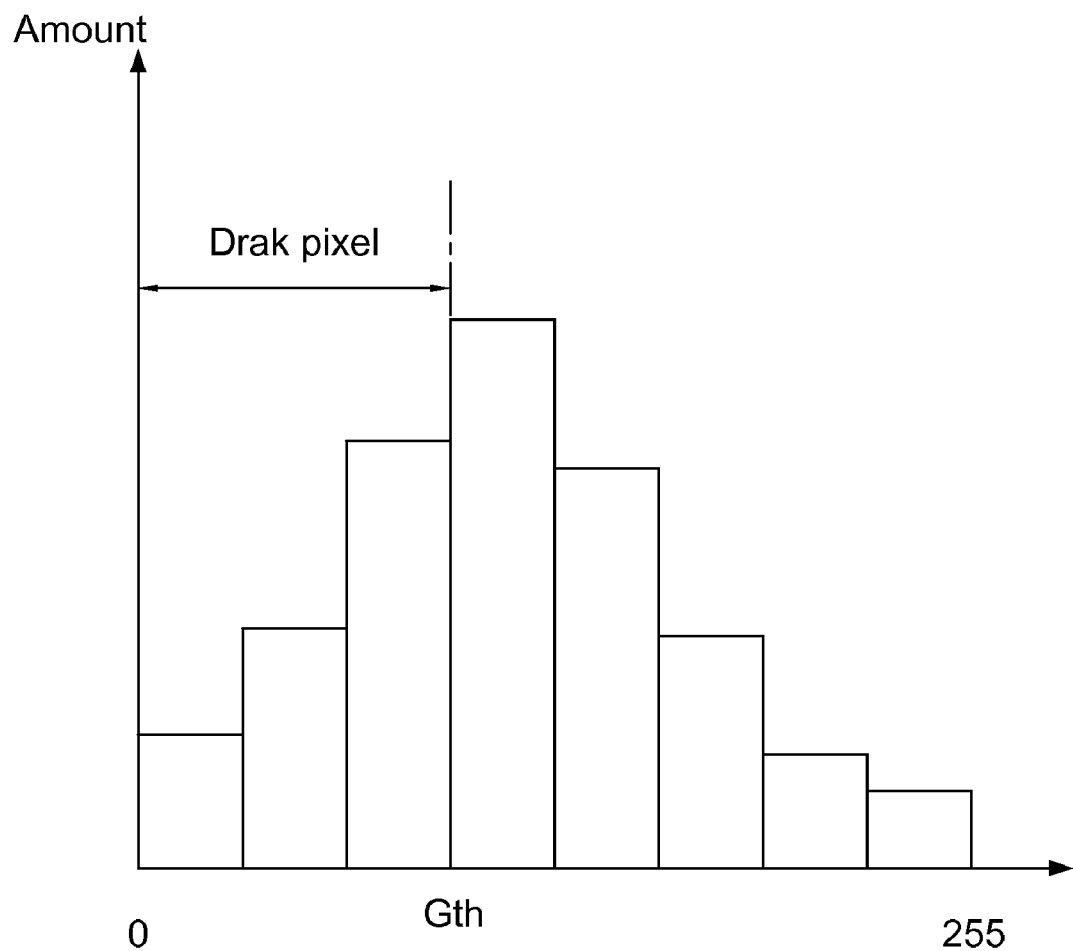
FIG. 2 is a schematic view of defining dark pixels and analyzing a dark pixel ratio according to the present invention.

Please refer to FIG. 2, which is a schematic view of determining the critical value. It should be noted that FIG. 2 and a procedure of determining the critical value described in the following are merely a demonstrative example, but not intended to limit the procedure of determining the critical value. In fact, a user may set any numerical value as the critical value.

Please refer to FIG. 2, in which the input image signal value adopted in the embodiment of the present invention is an image intensity value of the G color signal for analyzing the dark pixels, and a numerical value of the image intensity value is from 0 to 255. In this embodiment of the present invention, the range from 0 to 255 is divided into 8 equal parts, among which 3 equal parts having the lowest brightness serve as a dark pixel region 210 (3 equal parts on the most left side in FIG. 2), so as to determine that an image intensity value being 96 is the critical value (Gth). If an image intensity value of a pixel is smaller than the critical value (Gth), the pixel is defined as a dark pixel, and is counted to be one of the 3 equal parts defined as the dark pixels in the histogram of FIG. 2 when being counted. In the histogram of FIG. 2, a total number of the pixels represented by the 3 blocks on the most left side are a total number of the dark pixels, and a sum of all the blocks is a sum of all the pixels.

Please refer to FIG. 1, in which a plurality of image adjusting curve equations respectively corresponding to different dark pixel ratios is pre-loaded in the image output device, that is, an image adjusting curve equation is given to each dark pixel ratio value or dark pixel ratio range. After obtaining the dark pixel ratio, the image output device determines an image adjusting curve equation according to the dark pixel ratio (Step 40). In the image adjusting curve equation, a corresponding output image signal value may be obtained according to each input image signal value.

Figure 3:
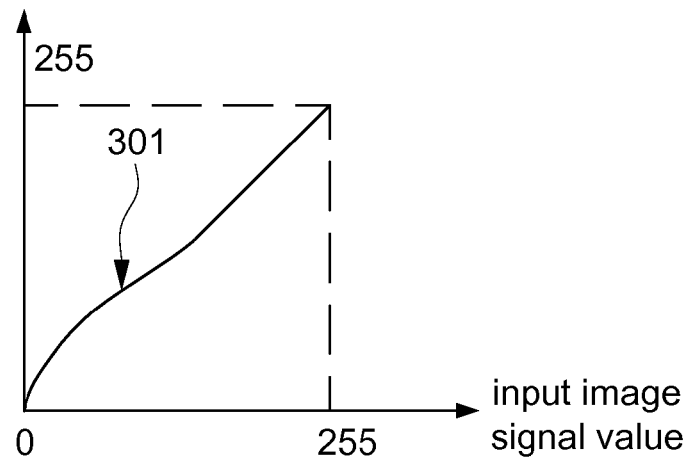
FIG. 3 is a schematic view of an image brightening curve equation according to the present invention.

FIG. 3 is a schematic view of an image brightening curve equation 301. By combining the image brightening curve equation 301 with a contrast curve equation, the image adjusting curve equation of the present invention is obtained. According to a variation of the dark pixel ratios, the image brightening curve equation 301 is given as a single curve in certain dark pixel ratio ranges, and in other dark pixel ratio ranges, the image brightening curve equation 301 is changed with the dark pixel ratios. Therefore, after the dark pixel ratio is obtained, the corresponding image brightening curve equation 301 is obtained, so as to be further combined with the contrast curve equation, thereby obtaining the required image adjusting curve equation.

Please refer to FIGS. 1, 4, and 5, in which the steps of determining the image brightening curve equation and further combining the image brightening curve equation 301 with the contrast curve equation to obtain the image adjusting curve equation are illustrated below.

Figure 4:
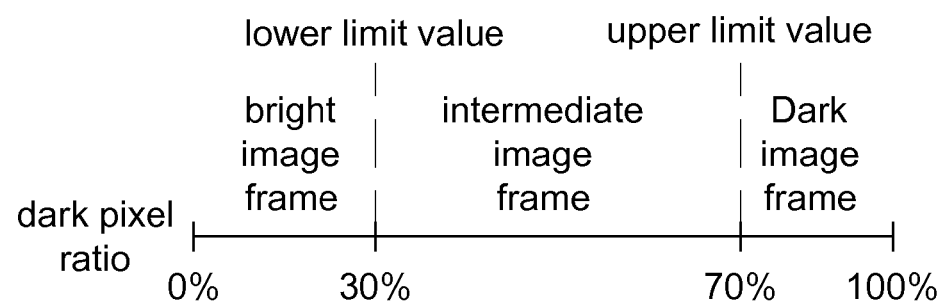
FIG. 4 is a schematic view of defining an attribute of a current image frame to be a dark image frame, a bright image frame, or an intermediate image frame according to the present invention.
Figure 5:
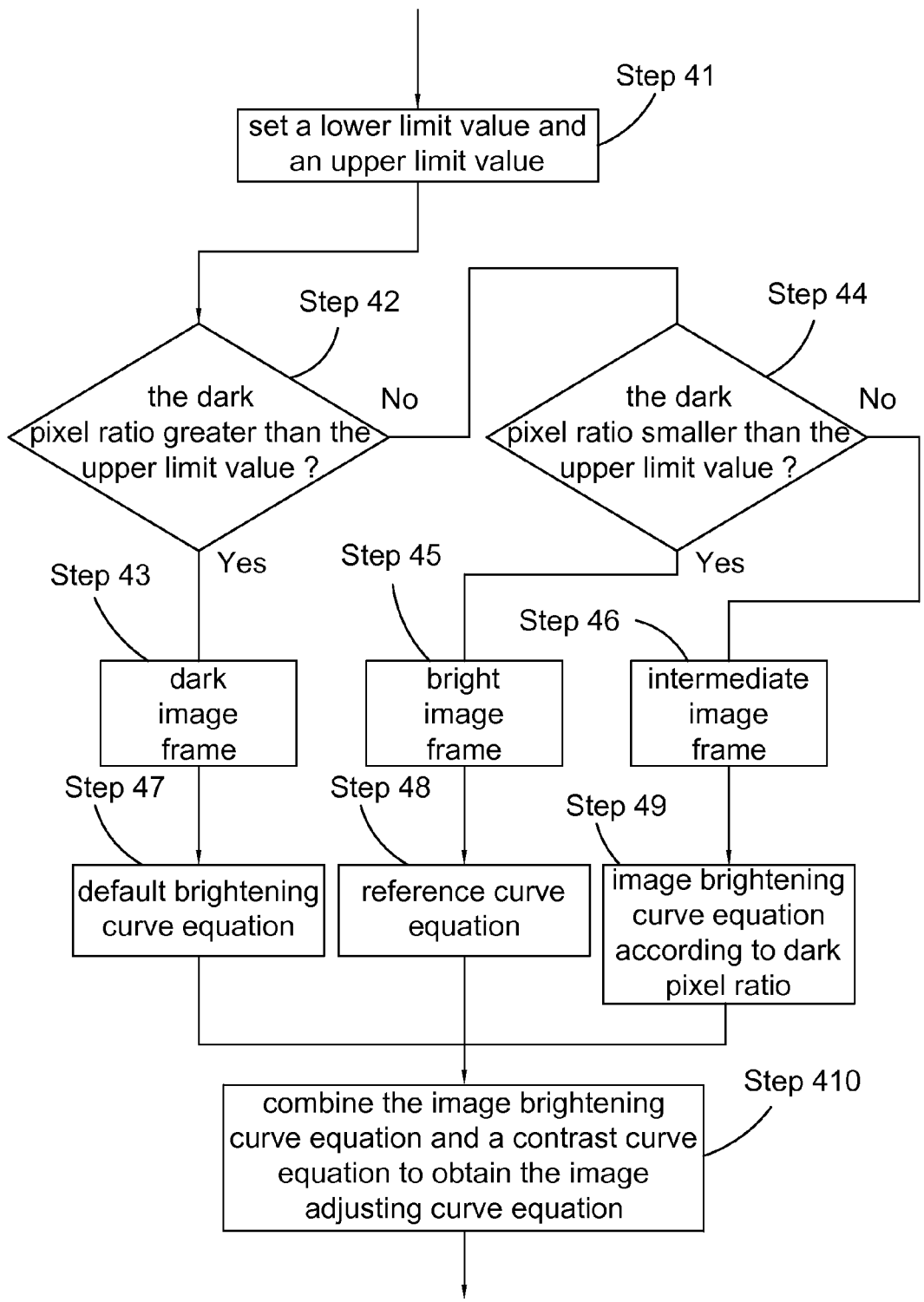
FIG. 5 is a flow chart of determining an image adjusting curve equation according to a dark pixel ratio according to the present invention.

Please refer to FIGS. 4 and 5, in which firstly, an attribute of the current image frame is defined as a dark image frame, an intermediate image frame, or a bright image frame.

The attribute of the current image frame is determined by the dark pixel ratio, such that a lower limit value and an upper limit value are set among the dark pixel ratios between 0% and 100% (Step 41).

When the dark pixel ratio is greater than the upper limit value (Step 42), indicating that the current image frame has more dark pixels, the brightness is lower, such that the current image frame is defined as a dark image frame (Step 43). When the dark pixel ratio is smaller than the lower limit value (Step 44), indicating that the current image frame has less dark pixels, the brightness is higher, such that the current image frame is defined as a bright image frame (Step 45). When the dark pixel ratio is between the lower limit value and the upper limit value, the current image frame is defined as an intermediate image frame (Step 46).

In this embodiment of the present invention, 30% is set as the lower limit value, and 70% is set as the upper limit value, such that when the dark pixel ratio is smaller than 30%, the current image frame is defined as a bright image frame; when the dark pixel ratio is greater than 70%, the current image frame is defined as a dark image frame; and when the dark pixel ratio is between 30% and 70%, the current image frame is defined as an intermediate image frame. The above-mentioned values 30% and 70% are only a demonstrative example, but not intended to limit the upper limit value and the lower limit value in the present invention.

Figure 6:
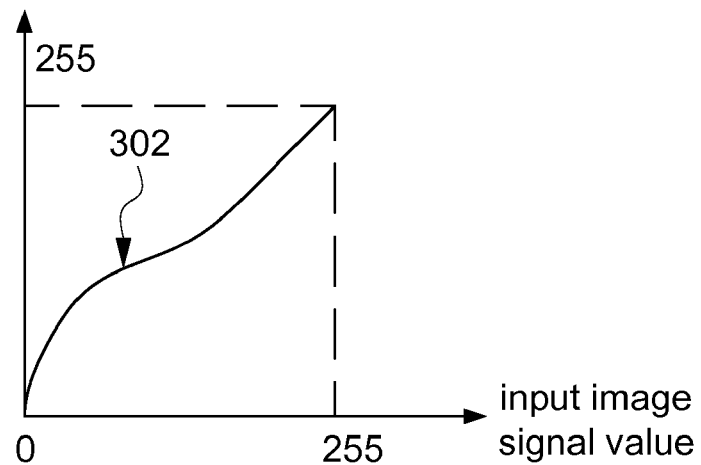
FIG. 6 is a schematic view of a default brightening curve equation according to the present invention.
Figure 7:
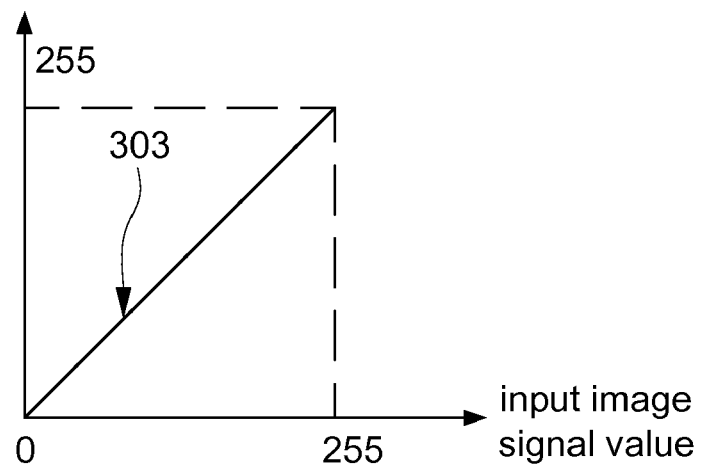
FIG. 7 is a schematic view of a reference curve equation according to the present invention.

Please refer to FIGS. 6 and 7, in which a default brightening curve equation 302 and a reference curve equation 303 are respectively shown. The image brightening curve equation 301 is obtained by combining the default brightening curve equation 302 with the reference curve equation 303 according to the variation of the dark pixel ratios. A transverse axis of the two curve diagrams represents the input image signal value (the numerical values=0-255), and the higher the image signal value is, the higher the intensity will be. A longitudinal axis represents the corresponding brightening image signal value (the numerical values=0-255) to be output, in the image brightening curve equation. In the present invention, the image brightening curve equation 301 given to each of the dark pixel ratios is obtained by combining the default brightening curve equation 302 with the reference curve equation 303, and finally the image brightening curve equation 301 is combined with the contrast curve equation, so as to obtain the image adjusting curve equation. A manner of combining the image brightening curve equation 301 is described below.

In the default brightening curve equation 302, when the input image signal value is lower, the corresponding brightening image signal value is higher than the input image signal, and when the input image signal value is higher, the input image signal value is equal to the brightening image signal value, such that the default brightening curve equation 302 has an effect of improving the brightness of the dark pixels, as shown in FIG. 6.

In the dark image frame, the dark pixel ratio is higher (for example, greater than 70%), such that the brightening image signal values of the dark pixels must be improved. Therefore, in the present invention, the default brightening curve equation 302 is directly taken as the image brightening curve equation 301, so as to correct each pixel in the dark image frame (Step 47), that is, the highest reinforcement effect is achieved, thereby improving the signal intensities of the dark image frame.

The reference curve equation 303 is a 45° oblique line extending from an origin, in which the brightening image signal value corresponding to each image input signal is equal to the original image signal input value, as shown in FIG. 7.

In the bright image frame, the dark pixel ratio is lower (for example, smaller than 30%), such that the brightening image signal values corresponding to the dark pixels do not have to be improved any more. Therefore, in the present invention, the reference curve equation 303 is directly taken as the image brightening curve equation 301, so as to correct each pixel in the bright image frame (Step 48), or the pixels are not corrected, and the original input image signal values directly serve as the output image signal values. In fact, the effect of adjusting the pixels through the reference curve equation 303 is equivalent to performing no adjustment on the pixels.

The image brightening curve equation 301 shown in FIG. 3 is one of a plurality of image brightening curve equations 301, which is used in the intermediate image frame having a corresponding dark pixel ratio (for example, between 30% and 70%). The image brightening curve equation 301 is obtained by combining the default brightening curve equation 302 with the reference curve equation 303. When the dark pixel ratio approaches the dark image frame, a weight of the default brightening curve equation 302 is increased, and a weight of the reference curve equation 303 is decreased, so as to combine the image brightening curve equation 301. Conversely, when the dark pixel ratio approaches the bright image frame, the weight of the default brightening curve equation 302 is decreased, and the weight of the reference curve equation 303 is increased, so as to combine the image brightening curve equation 301.

It should be noted that, the dark pixel ratio is obtained by analyzing one of a plurality of image signals, for example, in this embodiment, the dark pixel ratio is analyzed by using the G color signal of the RGB color signals, but as for the RGB color signals, each image signal in the pixel has to be adjusted through the obtained image brightening curve equation 301, for example, in this embodiment, the R color signal, the G color signal, and the B color signal all have be adjusted through the image brightening curve equation 301.

Among the above-mentioned pixels, if the dark pixel ratio belongs to a range of a dark image frame, the image output device takes the default brightening curve equation (Step 47) as the image adjusting curve equation of the dark image frame, so that the highest reinforcement effect is achieved, so as to improve the intensities of the image signal values of the dark image frame. If the dark pixel ratio belongs to a range of a bright image frame, the image output device takes the reference curve equation as the image adjusting curve equation (Step 48), that is, no adjustment is made to the bright image frame.

Theoretically, countless image brightening curve equations 301 corresponding to the intermediate image frame (for example, the dark pixel ratio is between 30% and 70%), may be obtained by combining the default brightening curve equation 302 with the reference curve equation 303. However, in order to reduce the consumption of the hardware resources, during the practical application, a finite number of image brightening curve equations 301 are obtained, so as to correspond to different dark pixel ratio ranges. For example, in the embodiment of the present invention, the large range of the dark pixel ratios between 30% and 70% may be divided into 256 dark pixel ratio ranges, and an image brightening curve equation 301 is given to each range (Step 49).

Figure 8:
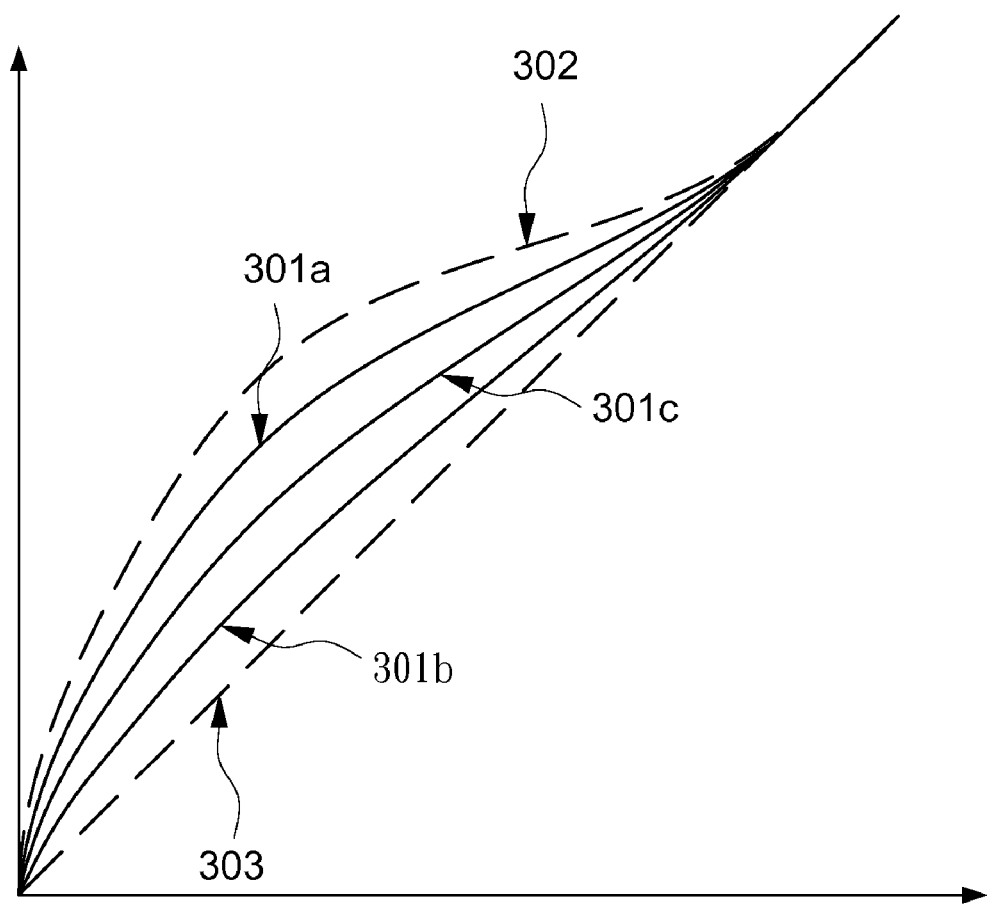
FIG. 8 is a schematic view of an image brightening curve equation obtained by combining the reference curve equation with the default brightening curve equation according to the present invention.

In FIG. 8, three image brightening curve equations 301a, 301b, and 301c corresponding to the intermediate image frame are taken for illustration. With the variation of the dark pixel ratios from high to low, the obtained image brightening curve equations 301a, 301b, and 301c respectively approach the default brightening curve equation 302 or the reference curve equation 303. The intermediate image frame corresponding to the image brightening curve equation 301a has a higher dark pixel ratio, and the attribute thereof tends to be the dark image frame, such that the line type thereof approaches the default brightening curve equation 302. The intermediate image frame corresponding to the image brightening curve equation 301b has a lower dark pixel ratio, and the attribute thereof tends to be the bright image frame, such that the line type thereof approaches the reference curve equation 303. The intermediate image frame corresponding to the image brightening curve equation 301c has a dark pixel ratio between that of the above two intermediate image frames, such that the line type thereof is between the other two image brightening curve equations 301a and 301b.

Please refer to FIG. 5, in which after the image brightening curve equation 301 corresponding to each dark pixel ratio is obtained, the image brightening curve equation 301 and a contrast curve equation are further combined, so as to obtain the image adjusting curve equation given to each dark pixel ratio (Step 410).

Please refer to FIG. 1, in which in order to prevent the intensities of the output image signal values of two successive image frames after being adjusted from being changed too much to result in flickers, the image output device has to further modify the image brightening curve equation 301 (Step 50). The modification on the image brightening curve equation 301 aims at reducing a difference between the image brightening curve equation 301 of the current image frame and the image brightening curve equation 301 of a previous image frame, and preventing the pixel from being excessively modified to result in flickers of the image frame.

Figure 9:
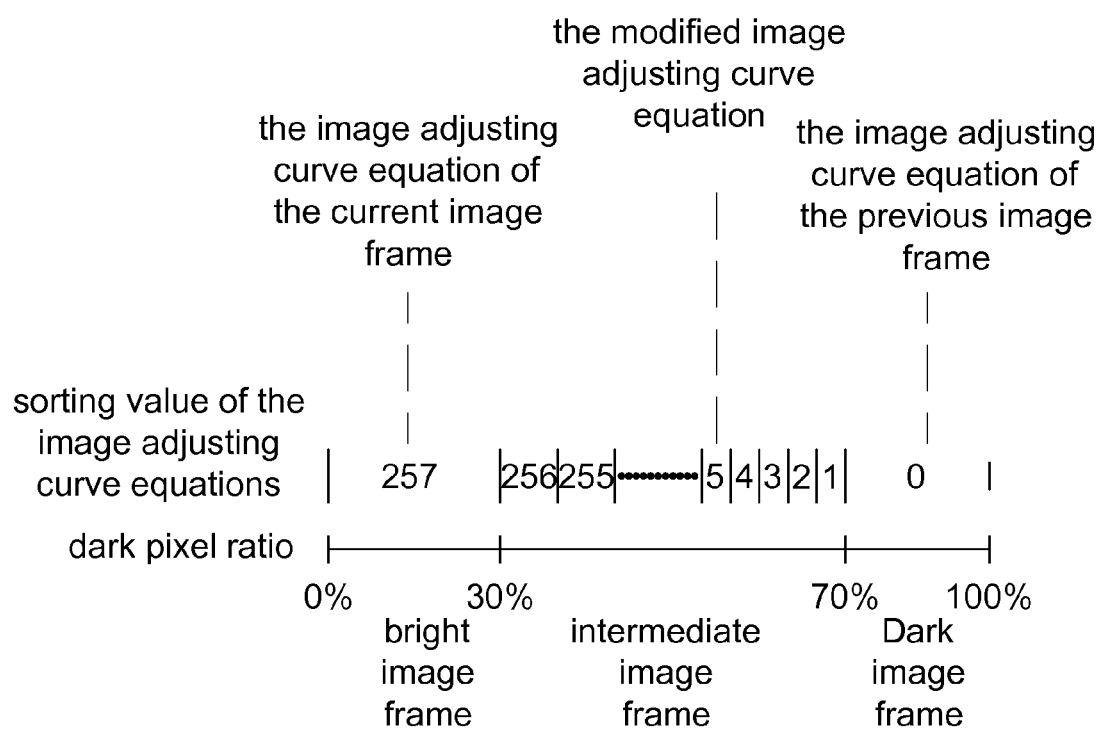
FIG. 9 is a schematic view of modifying an image adjusting curve equation according to the present invention.

Please refer to FIG. 9, in which since the dark pixel ratios vary from low to high, a sorting value is given to the image adjusting curve equation corresponding to each dark pixel ratio, in which if the dark pixel ratio is greater than the upper limit value (the dark image frame), the sorting value of the corresponding image adjusting curve equation is 0, and if the dark pixel ratio is smaller than the lower limit value (the bright image frame), the sorting value of the corresponding image adjusting curve equation is 257 (the large range of the dark pixel ratios between 30% and 70% may be divided into 256 dark pixel ratio ranges).

Each time before the image output device adjusts the current image frame, the image output device compares the image adjusting curve equation given to the current image frame with the image adjusting curve equation given to the previous image frame, and limits a given range for the image adjusting curve equation of the current image frame to modify the image adjusting curve equation given to the current image frame, such that the image adjusting curve equation is smoothly varied (Step 50). Considering the modifying manner, a sorting variation value is given, and a difference value between the sorting value of the image adjusting curve equation of the previous image frame and the sorting value of the image adjusting curve equation given to the current image frame is limited to be equal to or less than the sorting variation value. When the difference value is greater than the sorting variation value, an image adjusting curve equation capable of making the difference value equal to the sorting variation value is selected from the image adjusting curve equations approaching the sorting value of the image adjusting curve equation of the previous image frame, so as to serve as a modified image adjusting curve equation.

For example, when the sorting variation value is defined as 5, the sorting value of the image adjusting curve equation given to the current image frame must fall within a range of the sorting value of the image adjusting curve equation of the previous image frame plus or minus 5, and otherwise, an image adjusting curve equation capable of making the difference value equal to 5 is selected, so as to serve as the modified image adjusting curve equation.

The schematic view of FIG. 9 is used for making demonstrative description, and in the embodiment of the present invention, for example, if the previous image frame is a dark image frame, the sorting value of the image adjusting curve equation of the previous image frame is 0 (that is, the previous image frame is a dark image frame), and the sorting variation value is 5, such that the sorting value of the image adjusting curve equation given to the current image frame must be between 0 and 5. However, the attribute of the current image frame is defined as a bright image frame, such that the image adjusting curve equation having the sorting value of 257 is given to the current image frame. In this case, the difference value between the sorting values is greater than the sorting variation value of 5, such that an image adjusting curve equation 301 capable of making the difference value equal to 5, for example, an image adjusting curve equation having the sorting value of 5 in this example, is selected from the image adjusting curve equations approaching the sorting value of the image adjusting curve equation of the previous image frame, so as to serve as a modified image adjusting curve equation.

Finally, the image output device substitutes three input image signal values, R, G, B, of each pixel in the current image frame to the given image adjusting curve equation, obtains output image signal values of each pixel after making calculations, and combines all output image signal values to obtain a final output image frame (Step 60).

In the above embodiment, the image is corrected through the input image signal values of the R, G, B three color signals, but practically, the image may be corrected by using image signal values in other forms. For example, when image data has YUV image signal values, or an image output device has higher hardware resources for converting RGB signals into YUV signals, the image output device may respectively obtain a Y image signal value in Y, U, V three brightness color signals from each of the pixels, so as to serve as an input image signal value for analyzing an attribute of a current image frame. However, the finally obtained image adjusting curve equation is merely used for correcting the Y image signal value, and the U and V image signal values are only respectively multiplied by a fixed constant for reinforcement, so as to avoid the problem that the defined U and V image signal values are inconsistent in different image frame images, and avoid the problem that the influence on the image cannot be easily predicted after the U and V image signal values are adjusted. Certainly, if the image is a gray-scale image, the image output device only adjusts the brightness value Y.

Referring to the preferred embodiments of the present invention as shown in FIGS. 10, 11, and 12, practically speaking, the above image adjusting curve equations are made into a plurality of tables in advance, in which each table represents one of the image adjusting curve equations, and a sorting number is given to each table. The numerical value of each input image signal value is given as an integer from 0 to 255, so that the integers from 0 to 255 are sequentially filled in the fields of the input image signal values. Then, the output image signal values corresponding to the input image signal values from 0 to 255 are obtained through the corresponding image adjusting curve equations, and are filled in the corresponding fields in the table.

After the image output device analyzes the dark pixel ratio, the corresponding image adjusting curve equation may be determined according to the dark pixel ratio, and the corresponding table may be obtained according to the corresponding sorting number. Next, the input image signal value is substituted in the table, so as to quickly look up the corresponding output image signal value.

Please refer to FIG. 10, in which when the image output device analyzes the dark pixel ratio and determines that the current image frame is a dark image frame, the image output device loads the table having the sorting number of 0 (the sorting number of 0 is only an demonstrative example), the image adjusting curve equation represented by the table is obtained by combining the default brightening curve equation with the contrast curve equation, and the output image signal values corresponding to the input image signal values from 0 to 255 are respectively from X0 to X255.

Please refer to FIG. 11, in which when the image output device analyzes the dark pixel ratio and determines that the attribute of the current image frame is an intermediate image frame, the image output device further determines the sorting number where the image adjusting curve equation corresponding to the dark pixel ratio belongs to, and loads the sorting number (the sorting numbers from 1 to 256 are only an demonstrative example), which represents the image adjusting curve equation corresponding to each dark pixel ratio, and the output image signal values corresponding to the input image signal values from 0 to 255 are respectively from Y0 to Y255.

Please refer to FIG. 12, in which when the image output device analyzes the dark pixel ratio and determines that the attribute of the current image frame is a bright image frame, the image output device loads the table having the sorting number of 257 (the sorting number of 257 is only a demonstrative example), the image adjusting curve equation represented by the table is obtained by combining the reference curve equation with the contrast curve equation, and the output image signal values corresponding to the input image signal values from 0 to 255 are from Z0 to Z255 respectively.

In the method for adjusting image according to the present invention, the dark pixel ratio is analyzed directly, and the corresponding image adjusting curve equation is selected directly according to the dark pixel ratio for adjusting image, so as to achieve an adjustment effect similar to that of a dynamic curve method. However, the present invention analyzes the dark pixel ratio, instead of analyzing the image, and the dark pixel ratios and the corresponding image adjusting curve equations are made into tables, so as to read the corresponding output image signal values in a one-to-one manner, thereby greatly reducing an operation amount. Therefore, the consumption of the operation performance of the present invention is similar to that of the single curve method, which can be even adopted by a miniature electronic product using a lower-level processor, and as long as the number of the image adjusting curve equations is adjusted to an optimum value, both excellent adjustment effect and low consumption of operation performance, can be achieved.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An method for adjusting image, applied to an image output device, the method comprising the following steps of:
    obtaining a current image frame comprising a plurality of pixels;
    analyzing intensities of input image signal values of the pixels;
    defining each of the pixels having the input image signal value being smaller than an critical value as a dark pixel, and counting a number of the dark pixels to obtain a ratio of the dark pixels among all the pixels to serve as a dark pixel ratio;
    determining an image adjusting curve equation according to the dark pixel ratio; and
    substituting the input image signal value of each of the pixels to the image adjusting curve equation, obtaining an output image signal value of each of the pixels, and combining all the output image signal values to obtain a final output image frame.

2. The method for adjusting image as claimed in 1, wherein the image adjusting curve equation is a resultant curve equation of combining an image brightening curve equation with a contrast curve equation.

3. The method for adjusting image as claimed in 2, wherein the step of determining the image adjusting curve equation according to the dark pixel ratio comprises the steps of:
    setting a lower limit value and an upper limit value among dark pixel ratios between 0% and 100%;
    defining the current image frame as a dark image frame when the dark pixel ratio is greater than the upper limit value, determining a default brightening curve equation as the image brightening curve equation, and combining the image brightening curve equation with the contrast curve equation to obtain the image adjusting curve equation;
    defining the current image frame as a bright image frame when the dark pixel ratio is smaller than the lower limit value, determining a reference curve equation as the image brightening curve equation, and combining the image brightening curve equation with the contrast curve equation to obtain the image adjusting curve equation; and
    defining the current image frame as an intermediate image frame when the dark pixel ratio is between the lower limit value and the upper limit value, combining the reference curve equation with the default brightening curve equation to obtain the image brightening curve equation, and combining the image brightening curve equation with the contrast curve equation to obtain the image adjusting curve equation.

4. The method for adjusting image as claimed in 3, wherein in the default brightening curve equation, when the input image signal value is lower, a corresponding brightening image signal value is higher than the input image signal, and when the input image signal value is higher, the input image signal value is equal to the brightening image signal value.

5. The method for adjusting image as claimed in 3, wherein in the reference curve equation, a brightening image signal value corresponding to each of the input image signal values is equal to the input image signal value.

6. The method for adjusting image as claimed in 3, wherein the dark pixel ratio corresponding to the intermediate image frame is divided into a plurality of ranges, and an image adjusting curve equation is given to each of the ranges.

7. The method for adjusting image as claimed in 1, wherein the current image frame comprises R, G, B color signals, and in the step of analyzing the intensities of the input image signal values of the pixels, the G color signal serves as an input image signal value to be analyzed.

8. The method for adjusting image as claimed in 6, wherein in the step of substituting the input image signal value of each of the pixels to the image adjusting curve equation, the R color signal, the G color signal, and the B color signal are adjusted respectively through the image adjusting curve equation.

9. The method for adjusting image as claimed in 1, wherein the current image frame comprises Y, U, V image signal values, and in the step of analyzing the intensities of the input image signal values of the pixels, the Y image signal value serves as an input image signal value to be analyzed.

10. The method for adjusting image as claimed in 9, wherein in the step of substituting the input image signal value of each of the pixels to the image adjusting curve equation, the Y image signal value is adjusted through the image adjusting curve equation, and the U and V image signal values are respectively multiplied by a fixed constant.

11. The method for adjusting image as claimed in 1, wherein the step of determining the image adjusting curve equation according to the dark pixel ratio further comprises a step of modifying the image adjusting curve equation, so as to reduce a difference between the image adjusting curve equation of the current image frame and an image adjusting curve equation of a previous image frame.

12. The method for adjusting image as claimed in 11, wherein the step of modifying the image adjusting curve equation comprises:
    determining a sorting value to the image adjusting curve equation corresponding to each of the dark pixel ratios as the dark pixel ratios vary from low to high; and
    determining a sorting variation value, and limiting a difference value between a sorting value of the image adjusting curve equation of the previous image frame and a sorting value of the given image adjusting curve equation of the current image frame to be equal to or less than the sorting variation value.

13. The method for adjusting image as claimed in 11, wherein when the difference value is greater than the sorting variation value, an image adjusting curve equation capable of making the difference value equal to the sorting variation value is selected from image adjusting curve equations approaching the sorting value of the image adjusting curve equation of the previous image frame, so as to serve as a modified image adjusting curve equation.

14. The method for adjusting image as claimed in 1, wherein the image adjusting curve equations are made into a plurality of tables in advance, and each of the tables represents one of the image adjusting curve equations.

* * * * *